(12) United States Patent
Chen et al.

(10) Patent No.: US 11,876,421 B2
(45) Date of Patent: Jan. 16, 2024

(54) IRON CORE ASSEMBLY, MOTOR, COMPRESSOR AND VEHICLE

(71) Applicant: GUANGDONG WELLING AUTO PARTS CO., LTD., Guangdong (CN)

(72) Inventors: Hanxi Chen, Guangdong (CN); Guowei Sun, Guangdong (CN)

(73) Assignee: GUANGDONG WELLING AUTO PARTS CO., LTD., Guangdong (CN)

( * ) Notice: Subject to any disclaimer, the term of this patent is extended or adjusted under 35 U.S.C. 154(b) by 211 days.

(21) Appl. No.: 17/518,957

(22) Filed: Nov. 4, 2021

(65) Prior Publication Data
US 2022/0060076 A1 Feb. 24, 2022

Related U.S. Application Data

(63) Continuation of application No. PCT/CN2019/125545, filed on Dec. 16, 2019.

(30) Foreign Application Priority Data

May 28, 2019 (CN) .......................... 201910449645.6
May 28, 2019 (CN) .......................... 201920778307.2

(51) Int. Cl.
*H02K 3/34* (2006.01)
*H02K 1/12* (2006.01)
(Continued)

(52) U.S. Cl.
CPC ................. *H02K 3/34* (2013.01); *H02K 1/12* (2013.01); *H02K 3/30* (2013.01); *H02K 3/325* (2013.01); *F04B 35/04* (2013.01)

(58) Field of Classification Search
CPC . F04B 35/04; H02K 1/12; H02K 3/30; H02K 3/325; H02K 3/34
(Continued)

(56) References Cited

U.S. PATENT DOCUMENTS

2011/0273053 A1* 11/2011 Oka ...................... H02K 3/345
                                                            310/215
2018/0248419 A1*  8/2018 Nigo ...................... H02K 1/02
(Continued)

FOREIGN PATENT DOCUMENTS

CN          1494757 A      5/2004
CN        102195381 A      9/2011
(Continued)

OTHER PUBLICATIONS

Extended European Search Report dated May 2, 2022 received in European Patent Application No. EP 19930525.1.
(Continued)

*Primary Examiner* — Rashad H Johnson
(74) *Attorney, Agent, or Firm* — Scully, Scott, Murphy & Presser, P.C.

(57) ABSTRACT

An iron core assembly, a motor, a compressor and a vehicle are provided. The iron core assembly has an iron core body and multiple insulating skeletons. The iron core body has multiple iron core blocks. A mounting groove is provided at an edge of at least one end face of each iron core block. Each iron core block is arranged between two insulating skeletons. Out of the two insulating skeletons provided at two ends of an iron core block, an end face of at least one insulating skeleton, facing the iron core block, is provided with insulating protrusions. The insulating protrusions can wrap two sides of the iron core block. The insulating protrusions match the mounting groove.

18 Claims, 6 Drawing Sheets

(51) Int. Cl.
*H02K 3/30* (2006.01)
*H02K 3/32* (2006.01)
*F04B 35/04* (2006.01)

(58) Field of Classification Search
USPC ........................................................ 310/40 R
See application file for complete search history.

(56) References Cited

U.S. PATENT DOCUMENTS

| | | | |
|---|---|---|---|
| 2019/0074735 A1* | 3/2019 | Shono | H02K 1/165 |
| 2020/0119611 A1* | 4/2020 | Horng | H02K 1/146 |
| 2022/0200390 A1* | 6/2022 | Hirosawa | F04B 35/04 |
| 2022/0224183 A1* | 7/2022 | Lee | H02K 1/148 |

FOREIGN PATENT DOCUMENTS

| | | |
|---|---|---|
| CN | 107492966 A | 12/2017 |
| CN | 209562276 U | 10/2019 |
| JP | 2003-111329 A | 4/2003 |
| JP | 2004147380 A | 5/2004 |
| JP | 2006081398 A | 3/2006 |
| JP | 2006115694 A | 4/2006 |
| JP | 2006-180698 A | 7/2006 |
| JP | 2010-045868 A | 2/2010 |
| JP | 2011-188675 A | 9/2011 |
| JP | 2017-103850 A | 6/2017 |
| WO | 2017-175508 A1 | 10/2017 |
| WO | 2017/179115 A1 | 10/2017 |

OTHER PUBLICATIONS

Notice of Reasons for Refusal dated Oct. 18, 2022 received in Japanese Patent Application No. JP 2021-564170.
Notice of Reasons for Refusal dated Feb. 7, 2023 received in Japanese Patent Application No. JP 2021-564170.
Request for the Submission of an Opinion dated May 12, 2023 received in Korean Patent Application No. KR 10-2021-7034795.
International Search Report dated Mar. 27, 2020 received in International Application No. PCT/CN2019/125545 together with an English language translation.

* cited by examiner

IRON CORE ASSEMBLY, MOTOR, COMPRESSOR AND VEHICLE

CROSS-REFERENCE TO RELATED APPLICATIONS

The present application is a continuation application of PCT International Application No. PCT/CN2019/125545, filed on Dec. 16, 2019, which claims priority to and benefits of Chinese Patent Application No. 201910449645.6 filed with China National Intellectual Property Administration on May 28, 2019 and entitled "IRON CORE ASSEMBLY, MOTOR, COMPRESSOR AND VEHICLE", and Chinese Patent Application No. 201920778307.2 filed with China National Intellectual Property Administration on May 28, 2019 and entitled "IRON CORE ASSEMBLY, MOTOR, COMPRESSOR AND VEHICLE", the entire contents of which are herein incorporated by reference for all purposes. No new matter has been introduced.

FIELD

The present disclosure relates to the field of motor technology, and particularly, to an iron core assembly, a motor, a compressor, and a vehicle including the compressor.

BACKGROUND

In the application of products in the motor industry, the miniaturization and lightweight design of motors play an important role in reducing product costs and power consumption, so it has always been an ongoing research in the industry. Especially in the automobile industry, in order to reduce the weight of the whole vehicle, it usually adopts a smaller volume and weight stator iron core block structure concentrated winding motor (referred to as "block motor"), such as electric power steering system motor (EPS motor), water pump motor, main drive motor and compressor motor, etc.

Usually in order to reduce the power consumption of the block motor, the utilization rate of the motor winding groove will be increased, and the magnet wire with a larger conductor diameter will be wound. Part of the block motor adopts a three-stage insulation structure, which is composed of an insulating skeleton assembled at both ends of the iron core block and a groove insulation paper installed in the winding groove. This kind of insulation structure, in order to ensure sufficient creepage distance between the iron core and the magnet wire, especially for motors with higher working voltages, it is usually necessary to cover the insulating skeleton on the end surface of the iron core block and the thickness of this part extending along the end surface is arranged to be thicker. However, this will increase the height and volume of the stator in the axial direction. And because the winding is wound on the insulating skeleton, the coil circumference of the winding will also increase, resulting in an increase in motor resistance and a decrease in energy efficiency.

SUMMARY

The present disclosure is directed to solve at least one of the technical problems existing in the prior art or the related art.

To this end, the first aspect of the present disclosure proposes an iron core assembly.

The second aspect of the present disclosure proposes a motor.

The third aspect of the present disclosure proposes a compressor.

The fourth aspect of the present disclosure proposes a vehicle.

In view of this, according to the first aspect of the present disclosure, an iron core assembly is provided, which includes: an iron core body, comprising a plurality of iron core blocks, and a mounting groove being provided at an edge of at least one end surface of each of the iron core blocks; and a plurality of insulating skeletons, each of the iron core blocks being arranged between two of the insulating skeletons, and among two of the insulating skeletons distributed at both ends of each of the iron core block, one end surface of at least one of the insulating skeletons facing the iron core block being provided with an insulation protrusion for covering on both sides of the iron core block, and the insulation protrusion being matched with the mounting groove.

The iron core assembly provided by the present disclosure includes an iron core body and a plurality of insulating skeletons. The iron core body includes a plurality of iron core blocks, and the plurality of iron core blocks can be continuously distributed to form a ring-shaped iron core body. By setting each of the iron core block between two of the insulating skeletons, and setting a mounting groove at the edge of at least one end surface of each of the iron core block, among two of the insulating skeletons distributed at both ends of each of the iron core block, one end surface of the insulating skeleton of the mounting groove facing the iron core block is provided with an insulation protrusion. By covering the insulation protrusion on both sides of the iron core block, and matching the insulation protrusion with the mounting groove. On the one hand, since the insulation protrusion is covered on both sides of the iron core block, it can ensure sufficient creepage distance between the winding of the motor and the iron core assembly, at the same time, it effectively reducing the thickness of the part of the insulating skeleton covering the iron core block end surface and extending along the end surface. In the following, this part is set as the end portion of the insulating skeleton. In order to ensure the creepage distance between the winding and the iron core in the related art, compared with having to increase the thickness of the end portion of the insulating skeleton, the thickness of the end portion of the insulating skeleton is reduced. It greatly reduces the length of the iron core assembly in the axial direction of the iron core body, which is beneficial to reduce the volume of the motor, reduce the weight of the motor, and have high insulation reliability. Moreover, due to the reduction of the thickness of the end portion of the insulating skeleton, the axial length of the magnet wire wound on the iron core block will also be reduced, thereby reducing the amount of magnet wire and reducing the cost. On the other hand, due to the coordination of the insulation protrusion and the mounting groove, the setting of the insulation protrusion does not occupy the space of the winding groove. While improving the utilization rate of the winding groove, it is further conducive to reducing the volume of the motor and reducing the weight of the motor.

Specifically, in related technologies, the insulating skeleton is not covered on both sides of the iron core block, but is directly covered on the end surface of the iron core block. At this time, the creepage distance between the winding and the iron core assembly mainly depends on the thickness of the end portion of the insulating skeleton. In order to meet the requirements of the creepage distance, the thickness of the end portion of the insulating skeleton has to be set thicker. And because the insulating skeleton is distributed at both ends of the iron core block, it further increases the overall height of the iron core assembly, that is, the length of the iron core assembly in the axial direction of the iron core body. In the present disclosure, by setting a mounting groove on the iron core block and making the insulation protrusion on the insulating skeleton cover the iron core block and insert it in the mounting groove. At this time, the creepage distance between the winding and the iron core assembly mainly depends on the sum of the depth of the mounting groove in the axial direction of the iron core body and the height of the protrusion in the axial direction of the iron core body. Therefore, the thickness of the end portion of the insulating skeleton can be significantly reduced, greatly reducing the volume of iron core assembly.

According to an embodiment, the mounting grooves are provided on the edges of the two end surfaces of each of the iron core blocks, and the two insulating skeletons distributed at both ends of one iron core block are also equipped with insulation protrusion. The thickness of the end portions of the two insulating skeletons at the two ends of the iron core block can be reduced, and the length of the iron core assembly in the axial direction of the iron core body can be greatly reduced, thereby helping to reduce the volume of the motor.

According to an embodiment, the insulation protrusion and the insulating skeleton are integrally formed. The insulating skeleton can be an entire skeleton structure, or it can be composed of a skeleton structure and an integral structure of an insulating layer filled on the skeleton structure.

It should be noted that in the present disclosure, there is a mounting groove at the edge of the end surface of the iron core block, which means that the mounting groove is opened on the end surface of the iron core block, and the mounting groove extends to the edge of the end surface of the iron core block. That is to say, the mounting groove has only one side wall slot in its width direction. Here, by default, the direction in which the mounting groove extends to the edge is the width direction of the mounting groove, and the direction in which the mounting groove extends along the edge is the length direction of the mounting groove. The width and length directions of the mounting groove vary with the edge. In addition, the insulation protrusion is covered on both sides of the iron core block. It can be covered on both sides of the iron core block as a whole, or on both sides of part of the iron core block. The edge of the end surface of the iron core block is provided with a mounting groove, part of the edge is provided with a mounting groove, as long as it meets the conditions matching with the insulation protrusion.

In addition, the iron core assembly in the above-mentioned embodiment provided by the present disclosure may also have the following additional technical features.

According to an embodiment, the iron core block includes a yoke portion, a tooth portion and a pole shoe portion, and the insulation protrusion covers at least both sides of the tooth portion and the pole shoe portion.

In this embodiment, the iron core block can be formed by stacking and riveting multiple punching sheets. The iron core block includes a yoke portion, a tooth portion and a pole shoe portion, and the tooth portion is located between the yoke portion and the pole shoe portion. By setting the insulation protrusion to cover at least both sides of the tooth portion and pole shoe portion, it can ensure that there is sufficient creepage distance between the winding and the iron core assembly and ensure the insulation reliability of the iron core assembly.

According to an embodiment, the insulation protrusion is also covered on one side of the yoke portion facing the tooth portion.

In this embodiment, by also covering the insulation protrusion on one side of the yoke portion facing the tooth portion, it is beneficial to have a sufficient creepage distance between the winding and the iron core assembly, and further improve the insulation reliability of the iron core assembly. The insulation protrusion can completely cover one side of the yoke portion facing the tooth portion, or partially cover one side of the yoke portion facing the tooth portion, which can be set accordingly according to the actual situation.

According to an embodiment, two adjacent mounting grooves on two adjacent iron core blocks are in contact and communicated.

In this embodiment, any two adjacent iron core blocks are enclosed to form a winding groove. The magnet wire can be distributed in the winding groove and wound on the iron core block with the insulating skeleton and the groove insulation paper to form windings. Two adjacent mounting grooves on two adjacent iron core blocks can be set to contact and communicate with each other. At this time, the two communicated mounting grooves can be continuously distributed at the notches of the winding groove. On the one hand, it provides enough space for the insertion of the insulation protrusion, which is conducive to the insulation protrusion to cover the iron core block more and improve the insulation effect. On the other hand, it facilitates the processing of the mounting groove, avoids processing errors, and affects the running effect of the motor.

Of course, in the case that a plurality of iron core blocks are continuously distributed together, the two adjacent mounting grooves on two adjacent iron core blocks may not touch and are not communicated. At this time, one end of the mounting groove far away from the pole shoe portion has a side wall slot, which is beneficial to improve the installation stability of the insulation protrusion.

According to an embodiment, a depth $L_1$ of the mounting groove in an axial direction of the iron core body and a height $H_1$ of the insulation protrusion in the axial direction of the iron core body satisfy $H_1 \leq L_1$.

In this embodiment, by setting the depth $L_1$ of the mounting groove in the axial direction of the iron core body to be greater than or equal to the height $H_1$ of the edge protrusion in the axial direction of the iron core body, the assembly interference between the insulating skeleton and the iron core block can be effectively avoided.

According to an embodiment, a maximum magnetic density $T_1$ of the tooth portion of the iron core block covered by the insulation protrusion, a maximum magnetic density $T_2$ of the tooth portion of the iron core block not covered by the insulation protrusion, a width $D_1$ of the mounting groove on a cross section of the iron core body and a width $D_2$ of the tooth portion of the iron core block not covered by the insulation protrusion satisfy $D_1 \leq D_2 (T_1-T_2)/T_1$.

In this embodiment, since in the present disclosure, setting mounting grooves at the edges of the two end surfaces of the iron core block will narrow the width of the tooth portion and/or yoke portion of the iron core block in the end portion area. Since the yoke portion and the tooth portion of the iron core block are both the magnetic circuit of the motor, the width of the tooth portion and the yoke portion in the end portion area is narrowed, which will cause the magnetic density of the iron core block to increase, and the iron loss increases, especially, it has a greater impact on the tooth portion. Therefore, in order to reduce the above influence on motor loss, the maximum setting of the width D1 of the mounting groove on one cross section of the iron core body satisfies the following relationship: $D2(T1-T2)/T1$. D2 is the width of the effective area of the tooth portion of the iron core block, that is, the width of the tooth portion of the iron core block that is not covered by the insulation protrusion. T1 is the maximum magnetic density of the tooth portion of the iron core block covered by the insulation protrusion, T2 is the maximum magnetic density of the tooth portion of the iron core block not covered by the insulation protrusion, and the magnetic density is the magnetic flux density. It can effectively prevent the magnetic flux density of the tooth portion from exceeding the working saturation point, resulting in a sharp increase in iron loss.

The maximum magnetic density of the tooth portion of the iron core block covered by the insulation protrusion and the maximum magnetic density of the tooth portion of the iron core block not covered by the insulation protrusion, that is, the maximum magnetic flux density is set according to the motor speed and motor load, and it can also be set according to the material of the iron core block and/or the required motor efficiency at the same time. For example, in the case where the material of the punching sheets constituting the iron core block is silicon steel plate, the maximum magnetic flux density of the tooth portion of the iron core block covered by the insulation protrusion can be set to 2.0 T (wherein, T is the magnetic flux density Unit, Tesla). Since in the related art, the tooth portion of the iron core block has a magnetic flux density of 1.6 T to 1.8 T, generally, the maximum magnetic flux density of the tooth portion of the iron core block that is not covered by the insulation protrusion can be set to 1.6T, and then the relationship between D1 and D2 can be: $D1 \leq D2 (2.0 T-1.6 T)/2.0 T$.

According to an embodiment, the width D1 of the mounting groove on a cross section of the iron core body and the width D2 of the tooth portion of the iron core block not covered by the insulation protrusion satisfy $D1 \leq 0.2 D2$.

In this embodiment, by setting the width D1 of the mounting groove on one cross section of the iron core body to be less than or equal to 0.2 times the width D2 of the tooth portion of the iron core block not covered by the insulation protrusion. It can effectively prevent the width of the tooth portion and/or the yoke portion of the iron core block from being excessively narrowed in the end portion area, resulting in excessive increase of the magnetic flux density of the iron core block, especially the excessive increase of the magnetic flux density of the tooth portion of the iron core block, resulting in iron consumption increased sharply. In the case that the material of the punching sheets constituting the iron core block is silicon steel plate, it is suitable for a variety of motor speeds and a variety of motor loads, and meets a variety of required motor efficiencies. For example, the maximum magnetic flux density of the tooth portion of the iron core block covered by the insulation protrusion may be 1.8 T or 1.8 T or 1.3 T, etc., one-to-one correspondence, the maximum magnetic flux density of the tooth portion of the iron core block that is not covered by the insulation protrusion can be 1.5 T or 1.7 T or 1.1 T, etc., which will not be listed here.

According to an embodiment, the width D1 of the mounting groove on a cross section of the iron core body and the width D2 of the tooth portion of the iron core block not covered by the insulation protrusion satisfy $0.05 D2 \leq D1$.

In this embodiment, by setting the width D1 of the mounting groove on one cross section of the iron core body to be greater than or equal to 0.05 times the width D2 of the tooth portion of the iron core block not covered by the insulation protrusion. On the one hand, it is beneficial for the mounting groove to have enough width to facilitate the insertion of the insulation protrusion, and on the other hand, it is beneficial for the insertion of the thick enough insulation protrusion into the mounting groove to improve the insulation performance of the iron core assembly. In the case of integrated injection molding of the insulation protrusion and the insulating skeleton, it can be avoided that the insulation protrusion must be too thin to be inserted into the mounting groove, which facilitates the processing of the insulation protrusion. After taking the above factors into account, 0.05 is the result of multiple experiments.

According to an embodiment, the width D1 of the mounting groove on a cross section of the iron core block is the same or not exactly the same.

According to an embodiment, the iron core assembly also comprises an insulator member, being arranged in a winding groove formed by surrounding two adjacent iron core blocks.

In this embodiment, the insulation of the iron core assembly is ensured by installing an insulator member in the winding groove formed by surrounding two adjacent iron core blocks.

According to an embodiment, the insulator member is constructed by the part of the insulating skeleton extending into the winding groove. That is, in addition to the insulation protrusion, the insulating skeleton also has an insulating part that extends into the winding groove for insulation, and the insulating part covers the side wall slot of the winding groove.

According to an embodiment, the insulator member is a groove insulation paper, the groove insulation paper comprises two extension portions, the two extension portions are distributed at both ends of the groove insulation paper along the axial direction of the iron core body, and each of the extension portion extends along the axial direction of the iron core body, and the extension portion is located at a gap between two adjacent insulating skeletons.

In this embodiment, insulation is done by installing groove insulation paper in the winding groove. Compared with insulating skeletons installed at both ends of the iron core block extending into the winding groove, the insulating skeleton is usually made by injection molding, and then install it in conjunction with the winding groove, the part of the insulating skeleton that extends into the winding groove is thicker, which will occupy a large area of the winding groove. However, this solution uses groove insulation paper arranged in the winding groove to ensure the insulation effect while reducing the space occupied in the winding groove, thereby ensuring the utilization rate of the winding groove.

In addition, since the insulating skeleton corresponding to the iron core block is also set in blocks, there will be a gap between two adjacent insulating skeletons on two adjacent iron core blocks. The thickness of the end portion of the insulating skeleton is reduced, and at the same time, the height of the groove insulation paper matched with it in the axial direction of the iron core body is reduced. Therefore, by setting the groove insulation paper in the winding groove, and setting the extension portion of the groove insulation paper along the iron core body axial direction, to locate between the gaps between the two adjacent insulating skeletons, can block the gaps between the two adjacent insulating skeletons. This can compensate for the lack of creepage distance between the gap between adjacent insulating skeletons and the iron core block due to the reduction in the thickness of the insulating skeleton end portion, and can increase the creepage distance to ensure the creepage distance between the iron core assembly and the winding at the gap is sufficient to ensure the insulation reliability of the iron core assembly.

According to an embodiment, the length H2 of the extension portion extending along the axial direction of the iron core body and the height H1 of the insulation protrusion in the axial direction of the iron core body satisfy H2≥H1.

In this embodiment, by setting the length H2 of the extension portion along the axial direction of the iron core body to be greater than or equal to the height H1 of the insulation protrusion in the axial direction of the iron core body. This helps to compensate for sufficient creepage distance, so that the creepage distance meets the national standard or the customer's insulation safety requirements for the product.

According to an embodiment, the material of the insulating skeleton is liquid crystal polymer containing glass fibers or polybutylene terephthalate containing glass fibers.

In this embodiment, by setting the material of the insulating skeleton as liquid crystal polymer (LCP) containing glass fibers or polybutylene terephthalate (PBT) containing glass fibers, the insulation effect is good.

According to an embodiment, the material of the groove insulation paper is polyethylene terephthalate plastic or polyethylene naphthalate or polyphenylene sulfide.

In this embodiment, by setting the material of the groove insulation paper as polyethylene terephthalate plastic (PET) or polyethylene naphthalate (PEN) or polyphenylene sulfide (PPS), the insulation effect is good and not easy to damage.

The second aspect of the present disclosure provides a motor, including an iron core assembly as in any one of the above-mentioned embodiments.

Since the motor provided by the present disclosure has the iron core assembly of any one of the above-mentioned embodiments, it further has the beneficial effects of any one of the above-mentioned embodiments, which will not be repeated here. The motor includes a stator and a rotor, and further, the stator includes a winding and an iron core assembly as in any one of the above-mentioned embodiments. At this time, the winding groove is a stator slot. Of course, the rotor may also include the iron core assembly of any one of the above-mentioned embodiments, and the winding groove is a rotor groove.

Further, the motor is a rotating motor.

The third aspect of the present disclosure provides a compressor, including a motor such as any one of the above-mentioned embodiments.

The compressor provided by the present disclosure has the motor of any one of the above-mentioned embodiments and further has the beneficial effects of any one of the above-mentioned embodiments, which will not be repeated here.

The fourth aspect of the present disclosure provides a vehicle, including a compressor such as any one of the above-mentioned embodiments.

Since the vehicle provided by the present disclosure has the compressor of any one of the above-mentioned embodiments, it further has the beneficial effects of any one of the above-mentioned embodiments, which will not be repeated here.

Additional aspects and advantages of the present disclosure will become apparent in the following description or will be learned by practice of the present disclosure.

BRIEF DESCRIPTION OF THE DRAWINGS

The above and/or additional aspects and advantages of the present disclosure will become apparent and readily understood from the description of embodiments in conjunction with the following drawings.

Figure 1:
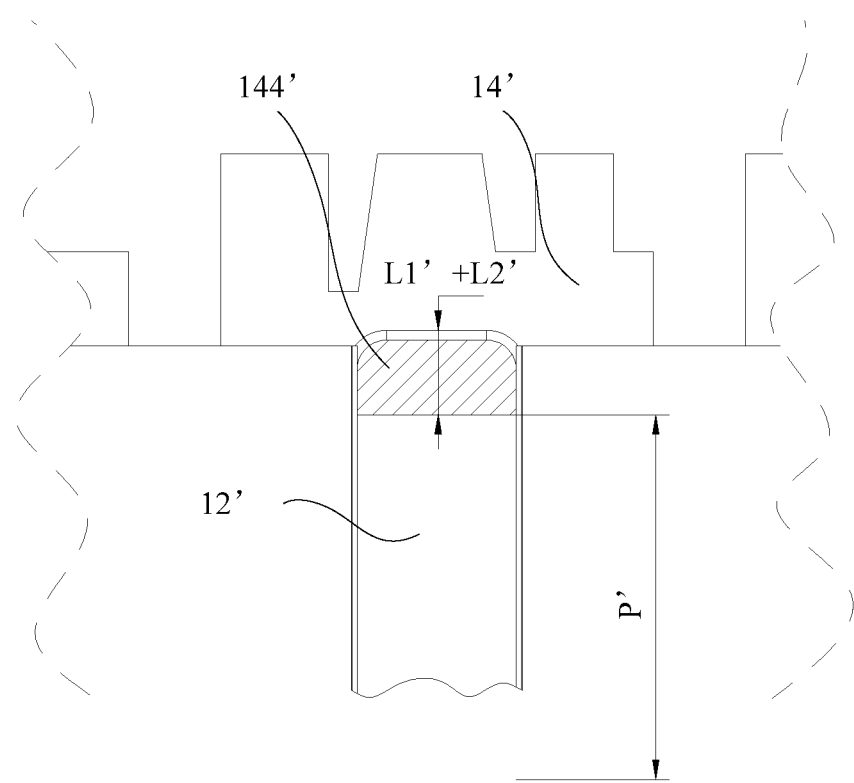
FIG. 1 shows a partial cross-sectional schematic diagram of an iron core block and an insulating skeleton in the related technology after unfolding.

The corresponding relationship between the reference signs and component names in FIG. 1 is as follows:

12' iron core block, 14' insulating skeleton, 144' end portion of insulating skeleton.

The corresponding relationship between the reference signs and component names in FIGS. 2-9 is as follows:

10 iron core assembly, 12 iron core block, 122 mounting groove, 124 yoke portion, 126 tooth portion, 128 pole shoe portion, 14 insulating skeleton, 142 insulation protrusion, 144 end portion of insulating skeleton, 16 winding groove, 18 groove insulation paper, 182 extension portion.

DETAILED DESCRIPTION OF EMBODIMENTS

In order that the above-mentioned objectives, features and advantages of the present disclosure can be understood more clearly, a further detailed description of the present disclosure will be given below in connection with the accompanying drawings and specific embodiments. It should be noted that the embodiments of the present disclosure and the features in the embodiments can be combined with each other if there is no conflict.

In the following description, numerous specific details are set forth in order to provide a thorough understanding of the present disclosure. However, the present disclosure can also be implemented in other manners than those described herein. Therefore, the protection scope of the present disclosure is not limited to the specific embodiments disclosed below.

Hereinafter, an iron core assembly, a motor and a compressor according to some embodiments of the present disclosure will be described with reference to FIGS. 1-9.

As shown in FIGS. 2-6, according to the first aspect of the present disclosure, an iron core assembly 10 is provided. The iron core assembly includes an iron core body and a plurality of insulting skeletons 14. The iron core body includes a plurality of iron core blocks 12. A mounting groove 122 is provided at an edge of at least one end surface of each of the iron core blocks 12. Each iron core blocks 12 is arranged between two of the insulating skeletons 14. Out of two of the insulating skeletons 14 distributed at both ends of each of the iron core block 12, one end surface of at least one of the insulating skeletons 14, facing the iron core block 12, is provided with an insulation protrusion 142 for covering both sides of the iron core block 12. The insulation protrusion 142 is matched with the mounting groove 122.

Figure 9:
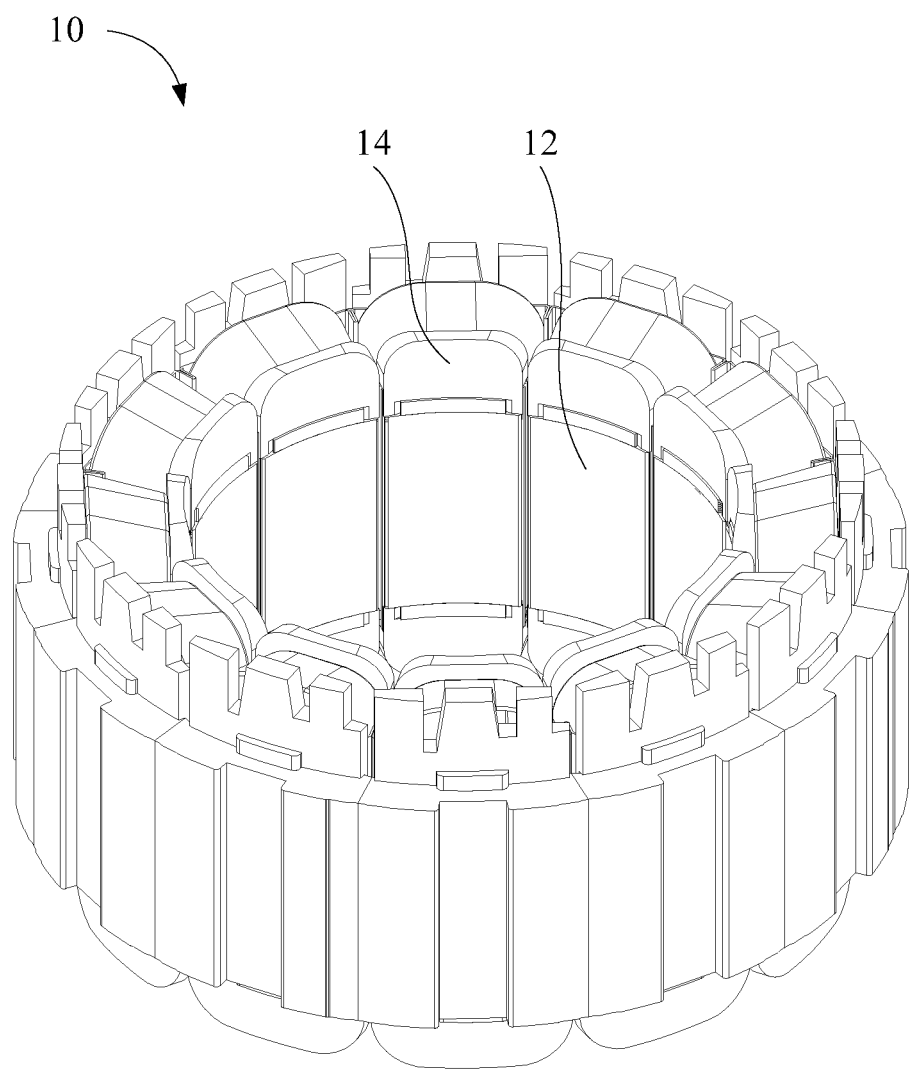
FIG. 9 shows a structural schematic diagram of an iron core assembly of an embodiment of the present disclosure.

The iron core assembly 10 provided by the present disclosure includes an iron core body and the plurality of insulating skeletons 14. As shown in FIG. 9, the plurality of iron core blocks 12 can be continuously distributed to form a ring-shaped iron core body. By setting each of the iron core block 12 between two of the insulating skeletons 14, and setting a mounting groove 122 at the edge of at least one end surface of each of the iron core block 12, one end surface of the insulating skeleton 14 of the mounting groove 122 facing the iron core block 12 is provided with an insulation protrusion 142, the insulation protrusion 142 covers on both sides of the iron core block 12, and the insulation protrusion 142 is matched with the mounting groove 122. On the one hand, since the insulation protrusion 142 is covered on both sides of the iron core block 12, it can ensure sufficient creepage distance between the winding of the motor and the iron core assembly 10, and at the same time, it effectively reducing the thickness of the part of the insulating skeleton 14 covering the end surface of the iron core block 12 and extending along the end surface. In the following, this part is set as the end portion 144 of the insulating skeleton 14. Conventionally, in order to ensure the creepage distance between the winding and the iron core, the thickness of the end portion 144' of the insulating skeleton 14' needs to be increased. Compared with the conventional scheme, the thickness of the end portion 144 of the insulating skeleton 14 is reduced. It greatly reduces the length of the iron core assembly 10 in the axial direction of the iron core body, which is beneficial to reduce the volume of the motor, reduce the weight of the motor, and have high insulation reliability. Moreover, due to the reduction of the thickness of the end portion 144 of the insulating skeleton 14, the axial length of the magnet wire wound on the iron core block 12 will also be reduced, thereby reducing the amount of magnet wire and reducing the cost. On the other hand, due to the coordination of the insulation protrusion 142 and the mounting groove 122, the setting of the insulation protrusion 142 does not occupy the space of the winding groove 16. While improving the utilization rate of the winding groove 16, it is further conducive to reducing the volume of the motor and reducing the weight of the motor.

Figure 2:
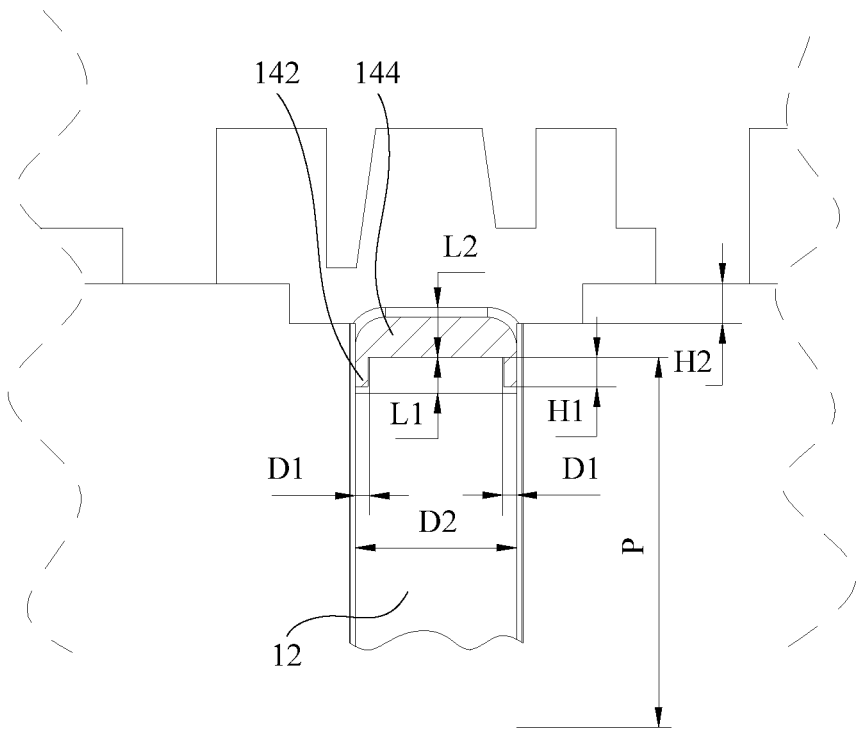
FIG. 2 shows a partial structural schematic diagram of an iron core block and an insulating skeleton of an embodiment of the present disclosure after unfolding.
Figure 3:
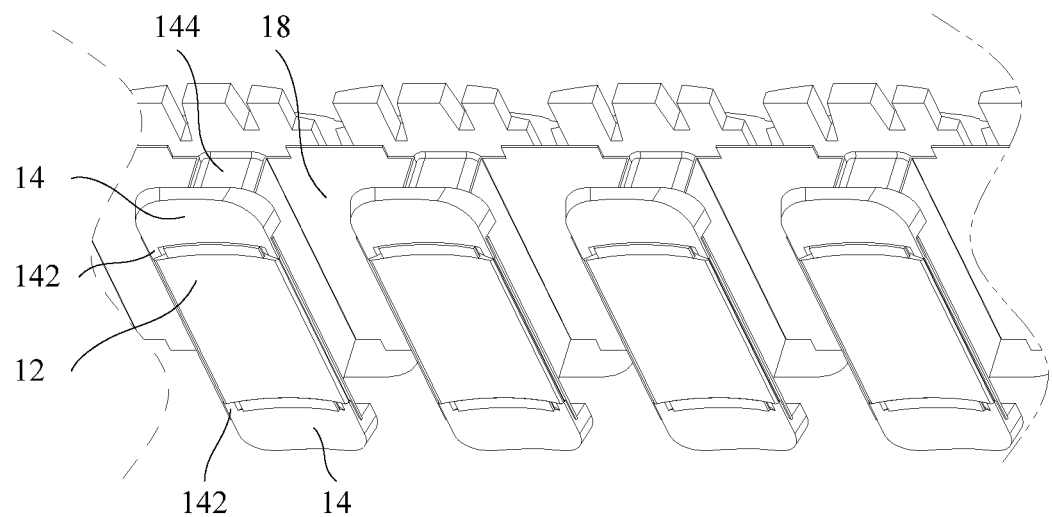
FIG. 3 shows a schematic diagram of an expanded three-dimensional structure of an iron core block and an insulating skeleton of an embodiment of the present disclosure.

In related technologies, as shown in FIG. 1, the insulating skeleton 14' is not covered on both sides of the iron core block 12', but is directly covered on the end surface of the iron core block 12'. At this time, the creepage distance between the winding and the iron core assembly 10 mainly depends on the thickness of the end portion 144' of the insulating skeleton 14', that is L1'+L2'. In order to meet the requirements of the creepage distance, the thickness of the end portion 144' of the insulating skeleton 14' has to be set thicker. And because the insulating skeleton 14' is distributed at both ends of the iron core block 12', it further increases the overall height of the iron core assembly 10, that is, the length of the iron core assembly 10 in the axial direction of the iron core body. Similarly, the increase in the thickness of the end portion 144' of the insulating skeleton 14' increases the winding length of the winding in the axial direction of the iron core body, which is the length P'+2(L1'+L2') of the iron core block 12'. In the present disclosure, as shown in FIG. 3, by setting a mounting groove 122 on the iron core block 12, and making the insulation protrusion 142 on the insulating skeleton 14 cover the iron core block 12 and insert it in the mounting groove 122. As shown in FIG. 2, at this time, the creepage distance between the winding and the iron core assembly 10 mainly depends on the sum of the depth L1 of the mounting groove 122 in the axial direction of the iron core body and the thickness L2 of the end portion 144 of the insulating skeleton 14. Therefore, the thickness of the end portion 144 of the insulating skeleton 14 can be significantly reduced, greatly reducing the volume of iron core assembly 10. Moreover, the winding length of the winding in the axial direction of the iron core body is also reduced, which is the length P+2×L2 of the iron core block 12, which can reduce L1 by 2 times, greatly reducing the volume of the iron core assembly 10.

Further, the mounting grooves 122 are provided on the edges of the two end surfaces of each of the iron core blocks 12, and the two insulating skeletons 14 distributed at both ends of one iron core block 12 are also equipped with insulation protrusion 142. The thickness of the end portions 144 of the two insulating skeletons 14 at the two ends of the iron core block 12 can be reduced, and the length of the iron core assembly 10 in the axial direction of the iron core body can be greatly reduced, thereby helping to reduce the volume of the motor.

Further, the insulation protrusion 142 and the insulating skeleton 14 are integrally formed. The insulating skeleton 14 can be an entire skeleton structure, or it can be composed of a skeleton structure and an integral structure of an insulating layer filled on the skeleton structure. In the case where the insulation protrusion 142 and the insulating skeleton 14 are integrally formed, the insulating skeleton 14 is equivalent to being partially embedded in the iron core block 12.

It should be noted that in the present disclosure, there is a mounting groove 122 at the edge of the end surface of the iron core block 12, which means that the mounting groove 122 is opened on the end surface of the iron core block 12, and the mounting groove 122 extends to the edge of the end surface of the iron core block 12. That is to say, the mounting groove 122 has only one side wall slot in its width direction. Here, by default, the direction in which the mounting groove 122 extends to the edge is the width direction of the mounting groove 122, and the direction in which the mounting groove 122 extends along the edge is the length direction of the mounting groove 122. The width and length directions of the mounting groove 122 vary with the edge. In addition, the insulation protrusion 142 is covered on both sides of the iron core block 12. It can be covered on both sides of the iron core block 12 as a whole, or on both sides of part of the iron core block 12. The edge of the end surface of the iron core block 12 is provided with a mounting groove 122, and part of the edge is provided with a mounting groove 122, as long as it meets the conditions matching with the insulation protrusion 142.

Figure 4:
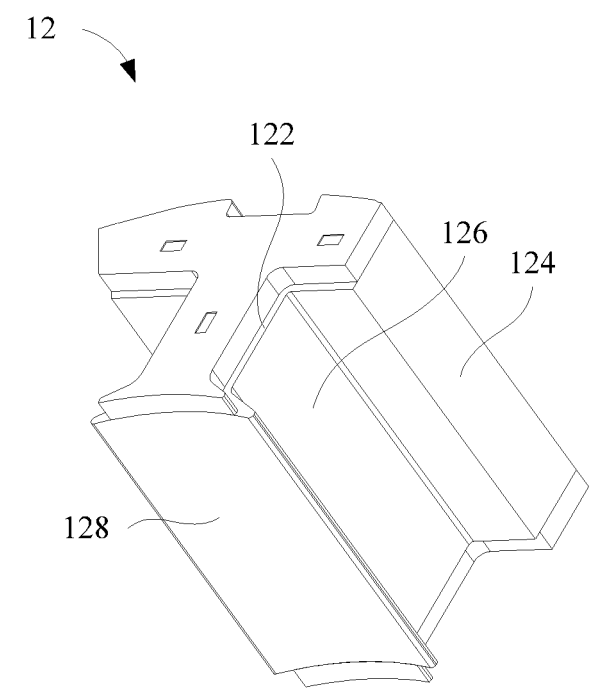
FIG. 4 shows a structural schematic diagram of an iron core block of an embodiment of the present disclosure.
Figure 5:
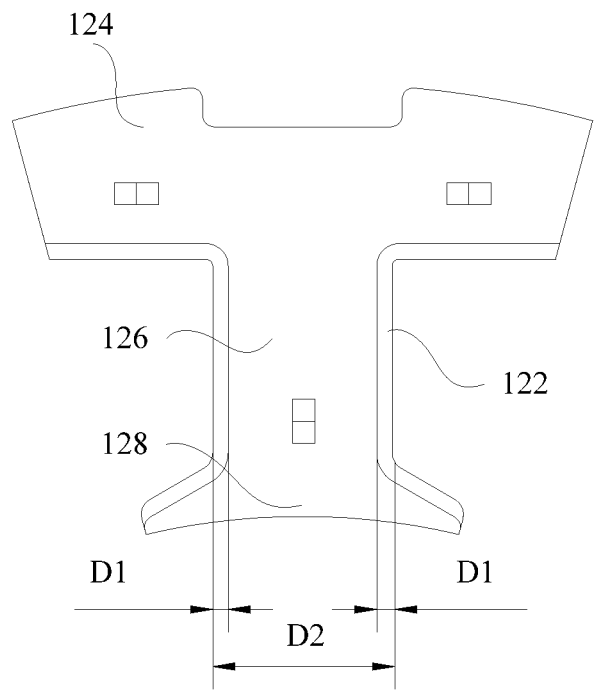
FIG. 5 shows a top-down structural schematic diagram of an iron core block of an embodiment of the present disclosure.
Figure 6:
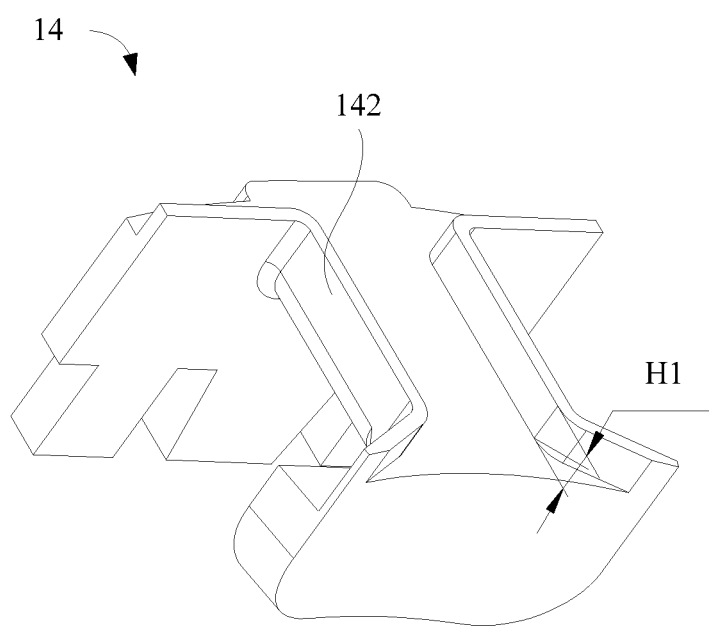
FIG. 6 shows a structural schematic diagram of an insulating skeleton of an embodiment of the present disclosure.

In some embodiments, as shown in FIGS. 4-6, the iron core block 12 includes a yoke portion 124, a tooth portion 126 and a pole shoe portion 128. The insulation protrusion 142 covers at least both sides of the tooth portion 126 and the pole shoe portion 128.

In this embodiment, the iron core block 12 can be formed by stacking and riveting multiple punching sheets. The iron core block 12 includes a yoke portion 124, a tooth portion 126 and a pole shoe portion 128. The tooth portion 126 is located between the yoke portion 124 and the pole shoe portion 128. By setting the insulation protrusion 142 to cover at least both sides of the tooth portion 126 and pole shoe portion 128, it can ensure that there is sufficient creepage distance between the winding and the iron core assembly 10 and ensure the insulation reliability of the iron core assembly 10.

In some embodiments, as shown in FIGS. 4-6, the insulation protrusion 142 is also covered on one side of the yoke portion 124 facing the tooth portion 126.

In this embodiment, by also covering the insulation protrusion 142 on one side of the yoke portion 124 facing the tooth portion 126, it is beneficial to have a sufficient creepage distance between the winding and the iron core assembly 10, and further improve the insulation reliability of the iron core assembly 10. The insulation protrusion 142 can completely cover one side of the yoke portion 124 facing the tooth portion 126, or partially cover one side of the yoke portion 124 facing the tooth portion 126, which can be set accordingly according to the actual situation.

Figure 8:
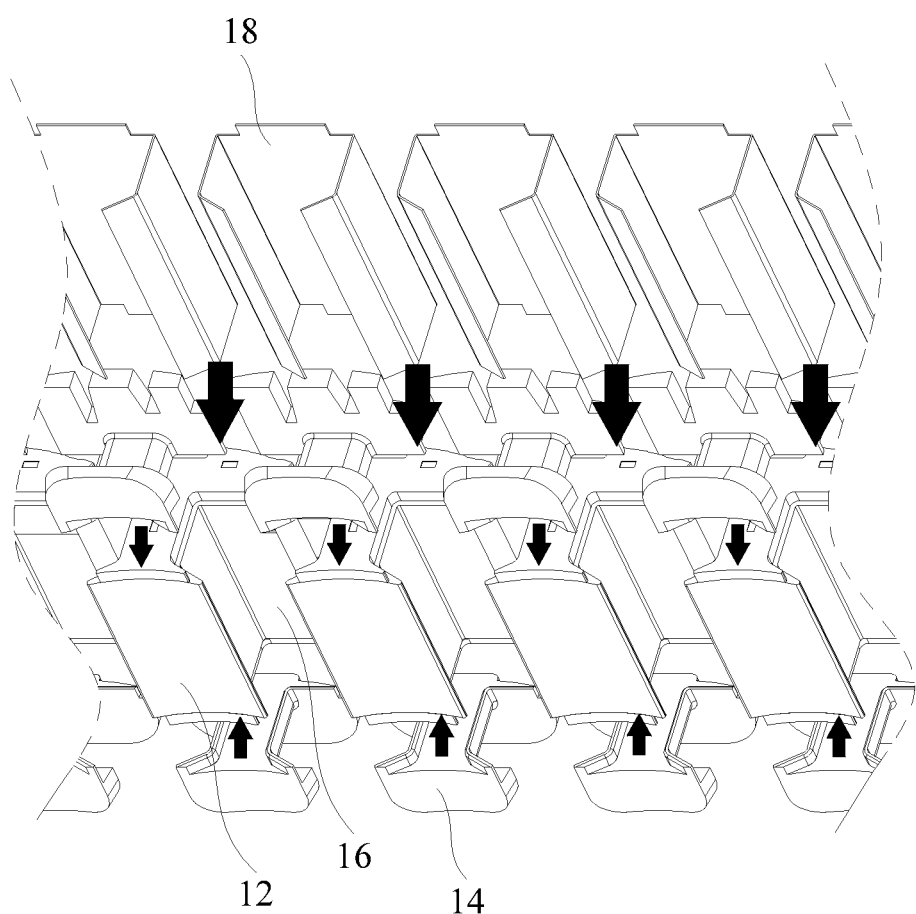
FIG. 8 shows a split schematic diagram of an iron core assembly of an embodiment of the present disclosure.

In some embodiments, as shown in FIG. 8, two adjacent mounting grooves 122 on two adjacent iron core blocks 12 are in contact and communicated with each other.

In this embodiment, any two adjacent iron core blocks 12 are enclosed to form a winding groove 16. The magnet wire can be distributed in the winding groove 16 and wound on the iron core block 12 with the insulating skeleton 14 and the groove insulation paper 18 to form windings. Two adjacent mounting grooves 122 on two adjacent iron core blocks 12 can be set to contact and communicate with each other. At this time, the two communicated mounting grooves 122 can be continuously distributed at the notches of the winding groove 16. On the one hand, it provides enough space for the insertion of the insulation protrusion 142, which is conducive to the insulation protrusion 142 to cover the iron core block 12 more and improve the insulation effect. On the other hand, it facilitates the processing of the mounting groove 122, avoids processing errors, and affects the running effect of the motor.

Of course, in the case that a plurality of iron core blocks 12 are continuously distributed together, the two adjacent mounting grooves 122 on two adjacent iron core blocks 12 may not touch and are not communicated. At this time, one end of the mounting groove 122 far away from the pole shoe portion 128 has a side wall slot, which is beneficial to improve the installation stability of the insulation protrusion 142.

In some embodiments, as shown in FIGS. 2-6, a depth L1 of the mounting groove 122 in an axial direction of the iron core body and a height H1 of the insulation protrusion 142 in the axial direction of the iron core body satisfy H1≤L1.

In this embodiment, by setting the depth L1 of the mounting groove 122 in the axial direction of the iron core body to be greater than or equal to the height H1 of the edge protrusion in the axial direction of the iron core body, the assembly interference between the insulating skeleton 14 and the iron core block 12 can be effectively avoided.

In some embodiments, as shown in FIG. 5, a maximum magnetic density T1 of the tooth portion 126 of the iron core block 12 covered by the insulation protrusion 142, a maximum magnetic density T2 of the tooth portion 126 of the iron core block 12 not covered by the insulation protrusion 142, a width D1 of the mounting groove 122 on a cross section of the iron core body and a width D2 of the tooth portion 126 of the iron core block 12 not covered by the insulation protrusion 142 satisfy D1≤D2(T1−T2)/T1.

In this embodiment, since in the present disclosure, setting mounting grooves 122 at the edges of the two end surfaces of the iron core block 12 will narrow the width of the tooth portion 126 and/or yoke portion 124 of the iron core block 12 in the end portion area. Since the yoke portion 124 and the tooth portion 126 of the iron core block 12 are both the magnetic circuit of the motor, the width of the tooth portion 126 and the yoke portion 124 in the end portion area is narrowed, which will cause the magnetic density of the iron core block 12 to increase, and the iron loss increases, especially, it has a greater impact on the tooth portion 126. Therefore, in order to reduce the above influence on motor loss, the maximum setting of the width D1 of the mounting groove 122 on one cross section of the iron core body satisfies the following relationship: D2(T1−T2)/T1. D2 is the width of the effective area of the tooth portion 126 of the iron core block 12, that is, the width of the tooth portion 126 of the iron core block 12 that is not covered by the insulation protrusion 142. T1 is the maximum magnetic density of the tooth portion 126 of the iron core block 12 covered by the insulation protrusion 142, T2 is the maximum magnetic density of the tooth portion 126 of the iron core block 12 not covered by the insulation protrusion 142, and the magnetic density is the magnetic flux density. It can effectively prevent the magnetic flux density of the tooth portion 126 from exceeding the working saturation point, resulting in a sharp increase in iron loss.

The maximum magnetic density of the tooth portion 126 of the iron core block 12 covered by the insulation protrusion 142 and the maximum magnetic density of the tooth portion 126 of the iron core block 12 not covered by the insulation protrusion 142, that is, the maximum magnetic flux density is set according to the motor speed and motor load, and it can also be set according to the material of the iron core block 12 and/or the required motor efficiency at the same time. For example, in the case where the material of the punching sheets constituting the iron core block 12 is silicon steel plate, the maximum magnetic flux density of the tooth portion 126 of the iron core block 12 covered by the insulation protrusion 142 can be set to 2.0 T (wherein, T is the magnetic flux density Unit, Tesla). Since in the related art, the tooth portion 126 of the iron core block 12 has a magnetic flux density of 1.6 T to 1.8 T, generally, the maximum magnetic flux density of the tooth portion 126 of the iron core block 12 that is not covered by the insulation protrusion 142 can be set to 1.6 T, and then the relationship between D1 and D2 can be: D1≤D2 (2.0 T−1.6 T)/2.0 T.

In some embodiments, the width D1 of the mounting groove 122 on a cross section of the iron core body and the width D2 of the tooth portion 126 of the iron core block 12 not covered by the insulation protrusion 142 satisfy D1≤0.2D2.

In this embodiment, by setting the width D1 of the mounting groove 122 on one cross section of the iron core body to be less than or equal to 0.2 times the width D2 of the tooth portion 126 of the iron core block 12 not covered by the insulation protrusion 142. It can effectively prevent the width of the tooth portion 126 and/or the yoke portion 124 of the iron core block 12 from being excessively narrowed in the end portion area, resulting in excessive increase of the magnetic flux density of the iron core block 12, especially the excessive increase of the magnetic flux density of the tooth portion 126 of the iron core block 12, resulting in iron consumption increased sharply. In the case that the material of the punching sheets constituting the iron core block 12 is silicon steel plate, it is suitable for a variety of motor speeds and a variety of motor loads, and meets a variety of required motor efficiencies. For example, the maximum magnetic flux density of the tooth portion 126 of the iron core block 12 covered by the insulation protrusion 142 may be 1.8 T or 1.8 T or 1.3 T, etc., and for example, the maximum magnetic flux density of the tooth portion 126 of the iron core block 12 covered by the insulation protrusion 142 can be 1.8 T or 1.8 T or 1.3 T, etc. one-to-one correspondence, the maximum magnetic flux density of the tooth portion 126 of the iron core block 12 that is not covered by the insulation protrusion 142 can be 1.5 T or 1.7 T or 1.1 T, etc., which will not be listed here.

In some embodiments, as shown in FIG. 5, the width D1 of the mounting groove 122 on a cross section of the iron core body and the width D2 of the tooth portion 126 of the iron core block 12 not covered by the insulation protrusion 142 satisfy $0.05 D2 \leq D1$.

In this embodiment, by setting the width D1 of the mounting groove 122 on one cross section of the iron core body to be greater than or equal to 0.05 times the width D2 of the tooth portion 126 of the iron core block 12 not covered by the insulation protrusion 142. On the one hand, it is beneficial for the mounting groove 122 to have enough width to facilitate the insertion of the insulation protrusion 142, and on the other hand, it is beneficial for the insertion of the thick enough insulation protrusion 142 into the mounting groove 122 to improve the insulation performance of the iron core assembly 10. In the case of integrated injection molding of the insulation protrusion 142 and the insulating skeleton 14, it can be avoided that the insulation protrusion 142 must be too thin to be inserted into the mounting groove 122, which facilitates the processing of the insulation protrusion 142. After taking the above factors into account, 0.05 is the result of multiple experiments.

In some embodiments, the width D1 of the mounting groove 122 on a cross section of the iron core block 12 is the same or not exactly the same.

In some embodiments, the iron core assembly 10 also comprises an insulator member, being arranged in a winding groove 16 formed by surrounding two adjacent iron core blocks 12.

In this embodiment, the insulation of the iron core assembly 10 is ensured by installing an insulator member in the winding groove 16 formed by surrounding two adjacent iron core blocks 12.

In some embodiments, the insulator member is constructed by the part of the insulating skeleton 14 extending into the winding groove 16. That is, in addition to the insulation protrusion 142, the insulating skeleton 14 also has an insulating part that extends into the winding groove 16 for insulation, and the insulating part covers the side wall slot of the winding groove 16.

In some embodiments, the insulator member is a groove insulation paper 18, the groove insulation paper 18 comprises two extension portions 182, the two extension portions 182 are distributed at both ends of the groove insulation paper 18 along the axial direction of the iron core body, and each of the extension portion 182 extends along the axial direction of the iron core body, and the extension portion 182 is located at a gap between two adjacent insulating skeletons 14.

In this embodiment, insulation is done by installing groove insulation paper 18 in the winding groove 16. Compared with insulating skeletons installed at both ends of the iron core block extending into the winding groove, the insulating skeleton is usually made by injection molding, and then install it in conjunction with the winding groove, the part of the insulating skeleton that extends into the winding groove is thicker, which will occupy a large area of the winding groove. However, this solution uses groove insulation paper 18 arranged in the winding groove 16 to ensure the insulation effect while reducing the space occupied in the winding groove 16, thereby ensuring the utilization rate of the winding groove 16.

In addition, since the insulating skeleton 14 corresponding to the iron core block 12 is also set in blocks, there will be a gap between two adjacent insulating skeletons 14 on two adjacent iron core blocks 12. The thickness of the end portion of the insulating skeleton 14 is reduced, and at the same time, the height of the groove insulation paper 18 matched with it in the axial direction of the iron core body is reduced. Therefore, by setting the groove insulation paper 18 in the winding groove 16, and setting the extension portion 182 of the groove insulation paper 18 along the iron core body axial direction, to locate between the gaps between the two adjacent insulating skeletons 14, can block the gaps between the two adjacent insulating skeletons 14. This can compensate for the lack of creepage distance between the gap between adjacent insulating skeletons 14 and the iron core block 12 due to the reduction in the thickness of the insulating skeleton 14 end portion, and can increase the creepage distance to ensure the creepage distance between the iron core assembly 10 and the winding at the gap is sufficient to ensure the insulation reliability of the iron core assembly 10.

Figure 7:
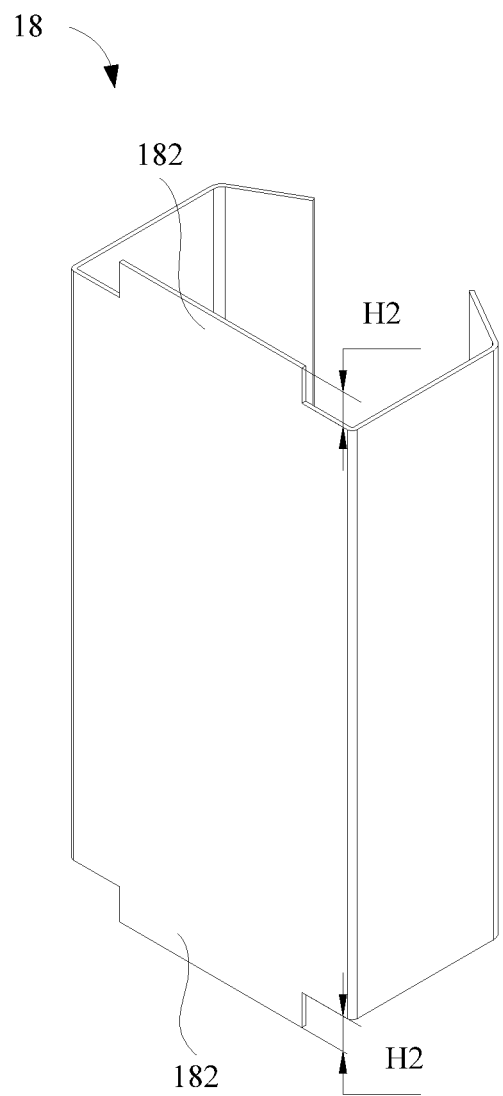
FIG. 7 shows a structural schematic diagram of a groove insulation paper of an embodiment of the present disclosure.

In some embodiments, as shown in FIGS. 6 and 7, the length H2 of the extension portion 182 extending along the axial direction of the iron core body and the height H1 of the insulation protrusion 142 in the axial direction of the iron core body satisfy $H2 \geq H1$.

In this embodiment, by setting the length H2 of the extension portion 182 along the axial direction of the iron core body to be greater than or equal to the height H1 of the insulation protrusion 142 in the axial direction of the iron core body. This helps to compensate for sufficient creepage distance, so that the creepage distance meets the national standard or the customer's insulation safety requirements for the product.

In some embodiments, the material of the insulating skeleton 14 is liquid crystal polymer containing glass fibers or polybutylene terephthalate containing glass fibers.

In this embodiment, by setting the material of the insulating skeleton 14 as liquid crystal polymer (LCP) containing glass fibers or polybutylene terephthalate (PBT) containing glass fibers, the insulation effect is good.

In some embodiments, the material of the groove insulation paper 18 is polyethylene terephthalate plastic or polyethylene naphthalate or polyphenylene sulfide.

In this embodiment, by setting the material of the groove insulation paper 18 as polyethylene terephthalate plastic (PET) or polyethylene naphthalate (PEN) or polyphenylene sulfide (PPS), the insulation effect is good and not easy to damage.

The second aspect of the present disclosure provides a motor, including an iron core assembly 10 as in any one of the above-mentioned embodiments.

Since the motor provided by the present disclosure has the iron core assembly 10 of any one of the above-mentioned embodiments, it further has the beneficial effects of any one of the above-mentioned embodiments, which will not be repeated here. The motor includes a stator and a rotor, and further, the stator includes a winding and an iron core assembly 10 as in any one of the above-mentioned embodiments. At this time, the winding groove 16 is a stator slot. Of course, the rotor may also include the iron core assembly 10 of any one of the above-mentioned embodiments, and the winding groove 16 is a rotor groove. Further, the motor is a rotating motor.

The third aspect of the present disclosure provides a compressor, including a motor such as any one of the above-mentioned embodiments.

The compressor provided by the present disclosure has the motor of any one of the above-mentioned embodiments and further has the beneficial effects of any one of the above-mentioned embodiments, which will not be repeated here.

Further, the compressor also includes a casing, a crankshaft, a cylinder and a piston, the motor is arranged in the casing, and the motor's rotor is sleeved on the crankshaft. The crankshaft is connected to the piston in the cylinder, and the motor drives the crankshaft to rotate, which in turn drives the piston to compress gas in the cylinder.

The embodiment of the fourth aspect of the present disclosure provides a vehicle, including the compressor as in any one of the above-mentioned embodiments.

The vehicle provided by the present disclosure has the compressor of any one of the above-mentioned embodiments, and further has the beneficial effects of any one of the above-mentioned embodiments, and will not be repeated here.

Further, the vehicle includes the vehicle body and the air conditioning system arranged on the vehicle body, and the compressor can be arranged in the air conditioning system.

Of course, the above-mentioned compressor is not limited to being arranged in the vehicle, and can also be arranged in other equipment that includes a refrigeration system, such as air conditioning equipment.

In the description of the present disclosure, the term "plurality" refers to two or more than two, unless clearly defined otherwise. The terms "mounted", "connected", "connecting", "fixed" and the like are to be construed broadly, and for example, the term "connected" may refer to a fixed connection, a flexible connection, or an integral connection, or an electrical connection; it may refer to a direct connection or an indirect connection through an intermediary. The specific meaning of the above terms in the present disclosure will be understood by those of ordinary skill in the art, as the case may be.

In the description of the present specification, the descriptions of the terms "one embodiment", "some embodiments" and "specific embodiments" and the like mean that specific features, structures, materials or characteristics described in conjunction with the embodiment(s) or example(s) are included in at least one embodiment or example of the present disclosure. In the specification, the schematic representation of the above terms does not necessarily refer to the same embodiment or example. Moreover, the particular features, structures, materials or characteristics described may be combined in a suitable manner in any one or more embodiments or examples.

The descriptions above are only preferred embodiments of the present disclosure, which are not used to limit the present disclosure. For a person skilled in the art, the present disclosure may have various changes and variations. Any modifications, equivalent substitutions, improvements etc. within the spirit and principle of the present disclosure shall all be included in the protection scope of the present disclosure.

What is claimed is:

1. An iron core assembly comprising:
   an iron core body comprising:
      a plurality of iron core blocks; and
      a mounting groove being provided at an edge of at least one end surface of each of the iron core blocks; and
   a plurality of insulating skeletons, each of the iron core blocks being arranged between two of the insulating skeletons,
   wherein out of two insulating skeletons provided at both ends of each of the iron core block, one end surface of at least one of the insulating skeletons is provided with an insulation protrusion for covering both sides of the iron core block, wherein said one end surface faces the iron core block,
   wherein the insulation protrusion is matched with the mounting groove, and
   wherein a depth $L1$ of the mounting groove in an axial direction of the iron core body and a height $H1$ of the insulation protrusion in the axial direction of the iron core body satisfy $H1 \leq L1$.

2. The iron core assembly according to claim 1,
   wherein the iron core block comprises a yoke portion, a tooth portion and a pole shoe portion, and
   wherein the insulation protrusion is configured to cover at least both sides of the tooth portion and the pole shoe portion.

3. The iron core assembly according to claim 2, wherein the insulation protrusion is further configured to cover one side of the yoke portion facing the tooth portion.

4. The iron core assembly according to claim 2, wherein a maximum magnetic density $T1$ of the tooth portion of the iron core block covered by the insulation protrusion, a maximum magnetic density $T2$ of the tooth portion of the iron core block not covered by the insulation protrusion, a width $D1$ of the mounting groove on a cross section of the iron core body and a width $D2$ of the tooth portion of the iron core block not covered by the insulation protrusion satisfy $D1 \leq D2 (T1-T2)/T1$.

5. The iron core assembly according to claim 4, wherein the width $D1$ of the mounting groove on a cross section of the iron core body and the width $D2$ of the tooth portion of the iron core block not covered by the insulation protrusion satisfy $D1 \leq 0.2D2$.

6. The iron core assembly according to claim 4, wherein the width $D1$ of the mounting groove on a cross section of the iron core body and the width $D2$ of the tooth portion of the iron core block not covered by the insulation protrusion satisfy $0.05D2 \leq D1$.

7. The iron core assembly according to claim 4, wherein widths $D1$ of the mounting grooves on a cross section of the respective iron core blocks are the same or substantially the same.

8. The iron core assembly according to claim 1, wherein two adjacent mounting grooves on two adjacent iron core blocks are in contact and communicated with each other.

9. The iron core assembly according to claim 1, further comprising an insulator member, wherein the insulator member is arranged in a winding groove formed by surrounding two adjacent iron core blocks.

10. The iron core assembly according to claim 9,
    wherein the insulator member comprises a groove insulation paper, and
    wherein the groove insulation paper comprises two extension portions, the two extension portions are distributed at both ends of the groove insulation paper along an axial direction of the iron core body, and each of the extension portion extends along the axial direction of the iron core body, and the extension portion is located at a gap between two adjacent insulating skeletons.

11. The iron core assembly according to claim 10, wherein the length $H2$ of the extension portion extending along the axial direction of the iron core body and the height H1 of the insulation protrusion in the axial direction of the iron core body satisfy H2≥H1.

12. The iron core assembly according to claim 10,
wherein the material of the insulating skeleton comprises liquid crystal polymer containing glass fibers or polybutylene terephthalate containing glass fibers; and/or
wherein the material of the groove insulation paper comprises polyethylene terephthalate plastic, polyethylene naphthalate, or polyphenylene sulfide.

13. A motor comprising the iron core assembly according to claim 1.

14. A compressor comprising the motor according to claim 13.

15. A vehicle comprising the compressor according to claim 14.

16. An iron core assembly comprising:
an iron core body comprising:
a plurality of iron core blocks; and
a mounting groove being provided at an edge of at least one end surface of each of the iron core blocks; and
a plurality of insulating skeletons, each of the iron core blocks being arranged between two of the insulating skeletons,
wherein out of two insulating skeletons provided at both ends of each of the iron core block, one end surface of at least one of the insulating skeletons is provided with an insulation protrusion for covering both sides of the iron core block, wherein said one end surface faces the iron core block,
wherein the insulation protrusion is matched with the mounting groove, and
wherein a maximum magnetic density T1 of a tooth portion of the iron core block covered by the insulation protrusion, a maximum magnetic density T2 of the tooth portion of the iron core block not covered by the insulation protrusion, a width D1 of the mounting groove on a cross section of the iron core body and a width D2 of the tooth portion of the iron core block not covered by the insulation protrusion satisfy D1≤D2 (T1−T2)/T1.

17. The iron core assembly according to claim 16, wherein the width D1 of the mounting groove on a cross section of the iron core body and the width D2 of the tooth portion of the iron core block not covered by the insulation protrusion satisfy D1≤0.2D2.

18. The iron core assembly according to claim 16, wherein the width D1 of the mounting groove on a cross section of the iron core body and the width D2 of the tooth portion of the iron core block not covered by the insulation protrusion satisfy 0.05D2≤D1.

* * * * *